(12) United States Patent
Gershinsky et al.

(10) Patent No.: US 8,797,864 B2
(45) Date of Patent: Aug. 5, 2014

(54) ADAPTIVE TRAFFIC MANAGEMENT VIA ANALYTICS BASED VOLUME REDUCTION

(75) Inventors: Gidon Gershinsky, Haifa (IL); Liane Lewin-Eytan, Binyamina (IL); Konstantin Shagin, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 332 days.

(21) Appl. No.: 13/008,918

(22) Filed: Jan. 19, 2011

(65) Prior Publication Data

US 2011/0176418 A1    Jul. 21, 2011

Related U.S. Application Data

(60) Provisional application No. 61/296,954, filed on Jan. 21, 2010.

(51) Int. Cl.
*H04L 12/56* (2006.01)

(52) U.S. Cl.
USPC .......... 370/230.1; 370/230; 370/231; 370/235

(58) Field of Classification Search
CPC .......... H04L 47/12; H04L 47/22; H04L 47/32
USPC ................ 370/230.1–235; 709/232–236, 246
See application file for complete search history.

(56) References Cited

U.S. PATENT DOCUMENTS

| | | | |
|---|---|---|---|
| 5,974,465 A | 10/1999 | Wong | |
| 6,141,053 A * | 10/2000 | Saukkonen | 375/240.01 |
| 6,654,373 B1 | 11/2003 | Maher, III et al. | |
| 6,680,906 B1 | 1/2004 | Nguyen | |
| 6,765,873 B1 * | 7/2004 | Fichou et al. | 370/235 |
| 6,839,321 B1 * | 1/2005 | Chiruvolu | 370/230.1 |
| 6,868,061 B1 * | 3/2005 | Kilkki et al. | 370/230.1 |
| 6,982,956 B2 * | 1/2006 | Blanc et al. | 370/235 |
| 7,061,862 B2 | 6/2006 | Horiguchi et al. | |
| 7,088,678 B1 | 8/2006 | Freed et al. | |
| 7,215,637 B1 * | 5/2007 | Ferguson et al. | 370/230.1 |
| 7,415,504 B2 | 8/2008 | Schiavone et al. | |
| 7,525,912 B2 | 4/2009 | Yazaki et al. | |
| 7,606,147 B2 | 10/2009 | Luft et al. | |
| 7,688,725 B2 * | 3/2010 | Sami et al. | 370/230 |
| 7,948,882 B2 * | 5/2011 | Chin et al. | 370/230 |
| 8,243,597 B2 * | 8/2012 | Castaneda et al. | 370/230.1 |
| 8,434,147 B2 * | 4/2013 | Jaeger et al. | 726/22 |

(Continued)

*Primary Examiner* — Kamal Divecha
*Assistant Examiner* — Amy Ling
(74) *Attorney, Agent, or Firm* — Trentice V. Bolar

(57) ABSTRACT

A method of managing traffic over a communication link between a transmitting node and a receiving node is provided herein. The method includes: determining momentary traffic shaping constraints; accumulating incoming messages at the transmitting node into a data queue, based on the momentary traffic shaping constraints; transmitting the messages from the data queue to the receiving node over the communication link based on the momentary traffic shaping constraints; estimating a desired amount of data that needs to be discarded from messages in the data queue, based on: (a) the size of the data queue and (b) the momentary traffic shaping constraints; sorting data in the data queue by an order of importance, based on analytic objects; discarding, based on the analytic objects, the desired amount of data from the messages in the queued data, such that the discarded data is ranked lowest by the order of importance.

21 Claims, 4 Drawing Sheets

(56) References Cited

U.S. PATENT DOCUMENTS

| | | | |
|---|---|---|---|
| 2004/0068577 A1* | 4/2004 | Ruutu | 709/236 |
| 2006/0233101 A1 | 10/2006 | Luft et al. | |
| 2007/0195773 A1* | 8/2007 | Tatar et al. | 370/392 |
| 2008/0056130 A1* | 3/2008 | Desai et al. | 370/231 |
| 2008/0239988 A1 | 10/2008 | Ptasinski et al. | |
| 2009/0219940 A1 | 9/2009 | Jansson | |
| 2009/0252219 A1* | 10/2009 | Chen et al. | 375/240.02 |
| 2011/0138400 A1* | 6/2011 | Chandler et al. | 719/314 |

\* cited by examiner

ADAPTIVE TRAFFIC MANAGEMENT VIA ANALYTICS BASED VOLUME REDUCTION

CROSS REFERENCE TO RELATED APPLICATIONS

This application is a Non-Provisional application claiming priority from U.S. Provisional Application 61/296,954, filed Jan. 21, 2010, entitled "Adaptive Traffic Management via Analytics-Based Volume Reduction" which is incorporated herein by reference in its entirety.

BACKGROUND

1. Technical Field

The present invention relates to traffic management within computer networks and more particularly, to volume reduction based on data analysis of the traffic.

2. Discussion of the Related Art

In a communication network, the rate at which data to be transferred over the network is generated often exceeds the capacity of the networking infrastructure. This is likely to occur in smart energy grids and other sensor-based systems which need to handle vast amounts of information produced by sensors. The problem also arises in inter-domain communication, when the capacity of the source domain is greater than that of the target domain (for example, traffic from an enterprise domain to a real-time domain or from a wired domain to a wireless.) On a smaller scale, two nodes that communicate via a low-bandwidth channel may run into a similar problem.

Currently there are two complementary approaches that may alleviate the problem by decreasing the transmission rate. One is delaying transmission of messages so that the resulting rate does not overwhelm the network. The other is rearranging/compressing the data into a more compact form, possibly discarding a portion of it. The two approaches are referred herein as traffic shaping and volume reduction, respectively. While the former addresses temporary load spikes, the latter has also the ability to resolve long-term bandwidth deficiency.

Among the most widely used traffic shaping methods are: (i) congestion control and (ii) flow control. Congestion control is the process of controlling traffic entry into a network, so as to avoid congestive collapse by attempting to avoid over-subscription of any of the processing or link capabilities of the intermediate nodes and networks. Flow control is the process of managing the rate of data transmission between two nodes to prevent the sender from overwhelming the receiver.

The volume reduction methods can be classified into lossless compression, message filtering and application-specific optimizations. Lossless compression employs a generic algorithm to compress data on the transmitter end and to decompress it to its original form on the receiver end. Message filtering policies, such as DDS HISTORY QoS and TIME_BASED_FILTER QoS allow discarding outdated or superfluous messages. Application-specific optimizations are custom methods that allow dropping entire messages, discarding the less critical parts of a message converting messages into a more compact format and aggregating a number of messages into one.

The aforementioned techniques may alleviate the problem to a certain degree, but none can solve it entirely in a sufficiently wide range of scenarios and applications. The traffic shaping methods may allow preventing network collapse in the presence of short bursts of data generation, but they are ineffective when the average data generation rate exceeds network capacity. Lossless compression may not compress the data sufficiently despite consuming a considerable amount of CPU. In addition, existing message filtering policies do not give an adequate solution for a large variety of applications, while application-specific optimization methods must be devised anew for each application.

In addition, a major drawback of existing volume reduction techniques is that they do not take into account the currently available amount of bandwidth, which is likely to change dynamically during the system operation. Their functionality is orthogonal to the state of the networking infrastructure. Consequently, reduction methods such as message filtering and application-specific optimizations often tend to discard more data than needed in order to meet the current network load.

BRIEF SUMMARY

One aspect of the invention provides a system for managing traffic over a communication link between a transmitting node and a receiving node. the system includes: a congestion monitor configured to repeatedly determine momentary traffic shaping constraints, being at least one of: a transmission rate and a burst size; a traffic shaper implemented as a token bucket and configured, based on the momentary traffic shaping constraints, to repeatedly: (i) accumulate incoming messages at the transmitting node into a data queue of a variable size; and (ii) transmit the messages from the data queue to the receiving node over the communication link; and a volume reducer configured to repeatedly: (i) estimate a desired amount of data that needs to be discarded from messages in the data queue, based on: (a) the size of the data queue and (b) the momentary traffic shaping constraints; (ii) sort data in the data queue by an order of importance, based on analytic objects; and (iii) discard, based on the analytic objects, the desired amount of data from the messages in the data queue, such that the discarded data is ranked lowest according to the order of importance. It is noted that the traffic shaper only transmits the messages from the queued data after the volume reducer discards the desired amount of data from it.

Some embodiments of the present invention allow applications to avoid network congestion by discarding the less important data, when needed and as much as needed. The data is discarded before queue overflow. Traffic shaping constraints cannot be violated due to token bucket. The amount of discarded data corresponds to the current network load. Thus, the amount of discarded data is minimized while bandwidth utilization is maximized. The application determines which data should be discarded using a generic interface.

According to some embodiments, the generic interface between the application and the framework consists of several types of analytic objects provided by the application and invoked by the framework. The analytic objects are a means by which the application expresses its preferences regarding data volume reduction. They are used to determine the relative importance of a data item, to discard data items, to aggregate a number of data items into one and to prevent disposal of the critical data. In other words, the input set of data items is transformed into output set of data items whose overall size is smaller.

In some embodiments, the behavior of the aforementioned analytic objects is dynamic. It may depend on various factors, such as application state. Moreover, the behavior of analytic objects can be modified by application logic residing on a remote node. Thus, the application is free to change its volume reduction preferences at any time during the execution.

In some embodiments, components of the system may reside in endpoints as well as in intermediate network components (e.g., bridges, routers or brokers). The analytic objects are shipped to the intermediate nodes during bootstrap and they are updated at run time if needed. Any node on the data path may choose to perform volume reduction based on the network load and its traffic shaping constraints.

The traffic shaping constraints determined by the congestion monitoring module can be derived from the local transmitter state and from the feedback of the remote receivers. Alternatively, the constraints can be received from an external source, such as a distributed resource management module. This makes it possible to set the transmitter traffic shaping parameters as a part of a global bandwidth management scheme.

Other aspects of the invention may include a method and a computer readable computer readable program configured to execute the aforementioned system. These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

Figure 1:
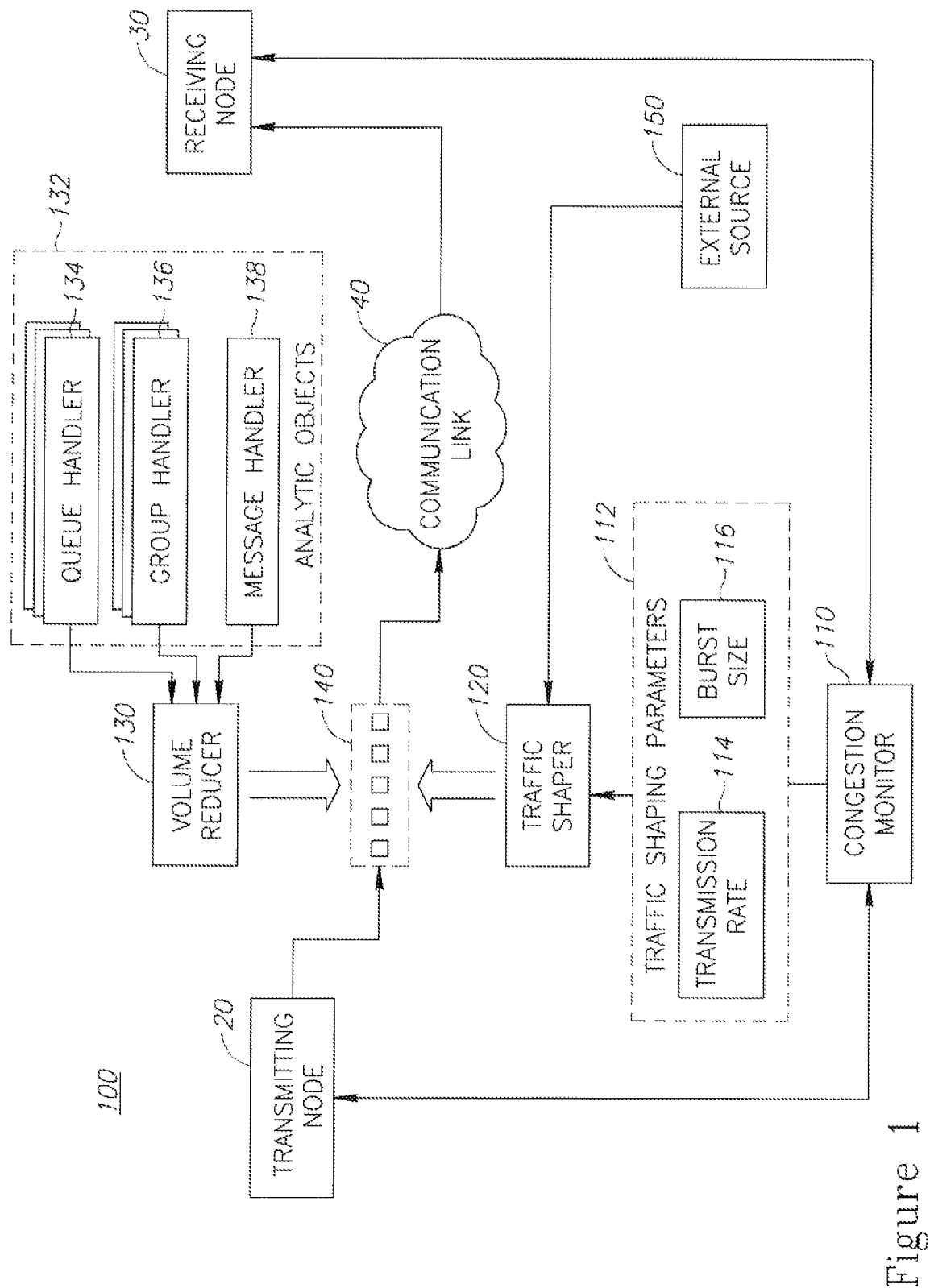
FIG. 1 is a high level schematic block diagram illustrating a system according to some embodiments of the invention.

The drawings together with the following detailed description make apparent to those skilled in the art how the invention may be embodied in practice.

DETAILED DESCRIPTION

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 is a high level schematic block diagram illustrating a system 100 for managing traffic over a communication link 40 between a transmitting node 20 and a receiving node 30. System 100 includes: a congestion monitor 110 configured to repeatedly determine momentary traffic shaping constraints 112, being at least one of: a transmission rate 114 and a burst size 116. System 100 further includes a traffic shaper 120 implemented as a token bucket and configured, based on the momentary traffic shaping constraints 112, to repeatedly: (i) accumulate incoming messages at the transmitting node into a data queue 140 of a variable size; and (ii) transmit the messages from the data queue to receiving node 30 over communication link 40. System 100 further includes a volume reducer 130 configured to repeatedly: (i) estimate a desired amount of data that needs to be discarded from messages in data queue 140, based on: (a) the size of data queue 140 and (b) the momentary traffic shaping constraints 112; (ii) sort data in the data queue by an order of importance, based on analytic objects; and (iii) discard, based on the analytic objects, the desired amount of data from the messages in data queue 140, such that the discarded data is ranked lowest according to the order of importance. Furthermore, traffic shaper 120 only transmits the messages from data queue 140 after volume reducer 130 discards the desired amount of data from it.

Figure 2:
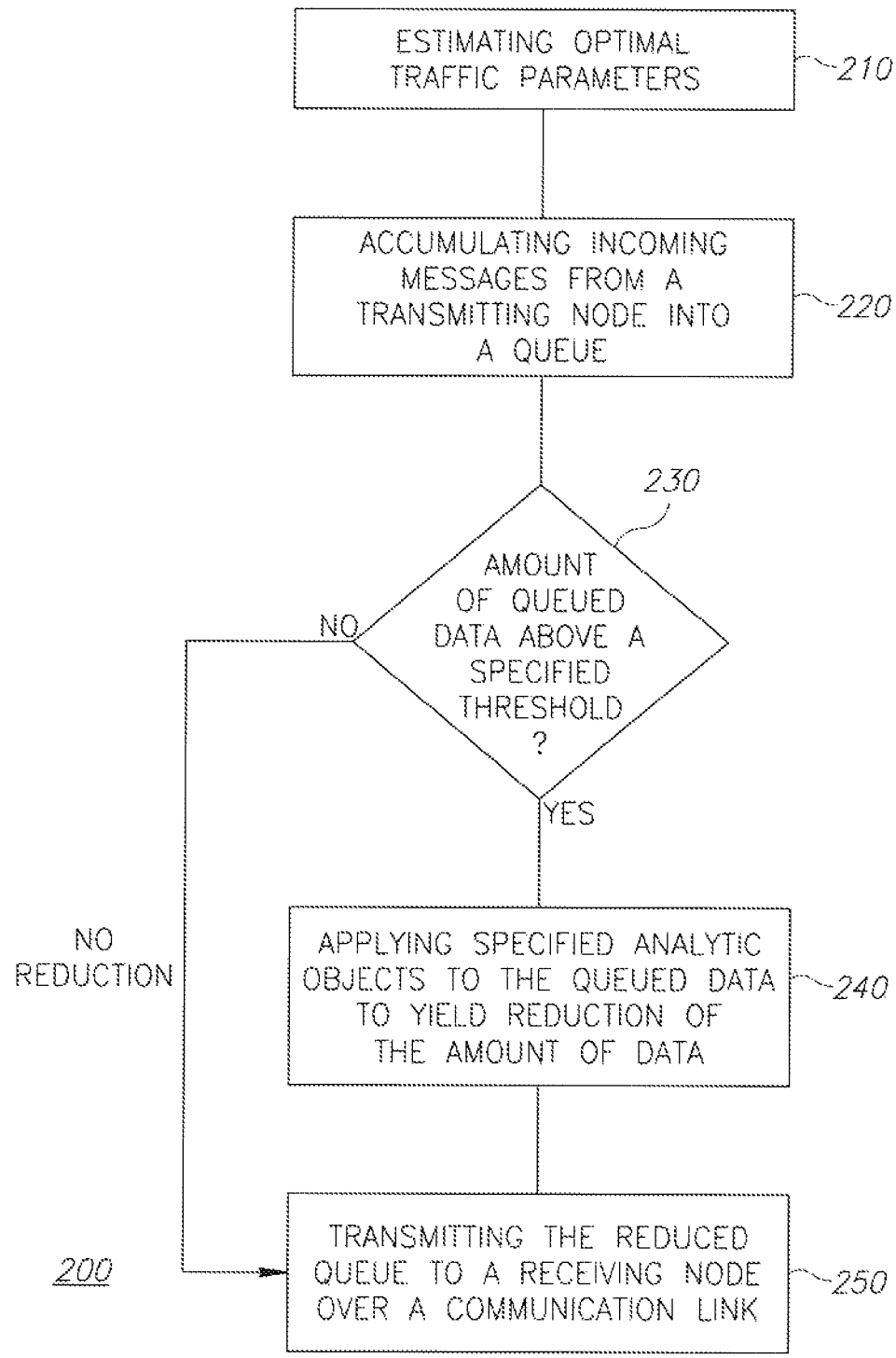
FIG. 2 is a high level flowchart diagram illustrating a method according to some embodiments of the invention.

FIG. 2 is a high level flowchart diagram illustrating a method according to some embodiments of the invention. A method 200 of managing traffic over a communication link between a transmitting node and a receiving node is illustrated. Method 200 includes the following stages: estimating momentary traffic shaping constraints 210; accumulating incoming messages at the transmitting node into a data queue of a variable size, based on the momentary traffic shaping constraints. The amount of queued data is being monitored 230. If the amount of queued data exceeds a specified threshold, method 200 goes on to applying analytic objects thereto 240, to yield a reduction in the amount of queued data, and then transmitting 250 the reduced messages to the receiving node. If the amount of queued data is below the specified threshold no reduction is carried out and the messages on the queue are transmitted 250. It should be noted that method 200 is not limited to be implemented by the aforementioned architecture of system 100 and other forms of implementation, either in hardware or in software are possible.

Consistent with some embodiments of the invention, on the transmitting node 20 side, the traffic shaping constraints 112 may be estimated by observing congestion indications such as negative acknowledgements and acknowledgement timeouts. Initially, they are set according to maximal capacity of the underlying network. Upon detecting signs of congestions, the traffic shaping parameters are reduced to a portion of their initial value. In the absence of congestion indications the parameters are gradually increased. Overall, the process is similar to management of transmission window in TCP. The transmission rate and burst size may be changed independently, i.e., in different elements and in response to different congestion indications.

According to some embodiments of the invention, another input for traffic shaper 120 that may help to set constraint is provided. The receiving node 30 side may determine the optimal traffic shaping constraints 112 from its own perspective based on observed loss rate, available buffer space and the like. The receiving node 30 side may communicate the resulting parameters to congestion monitor 110 on the side of transmitting node 20. Transmitting node 20 will then factor in the received parameters into the local estimations.

According to another embodiment of determining traffic shaping constrains, traffic shaping parameters can be overridden by an external source 150 possibly residing in a remote location. This allows for implementation of a global bandwidth management scheme.

According to some embodiments, traffic shaper 120 is essentially a token bucket. A token is added to the bucket every $1/R_{out}$ seconds. The bucket can hold at the most depth tokens. If a token arrives when the bucket is full, it is discarded. When a message of n bytes arrives, n tokens are removed from the bucket, and the message is transmitted. If fewer than n tokens are available, no tokens are removed from the bucket, and the message is considered to be non-conformant.

Non-conformant messages are queued for subsequent transmission when sufficient tokens have accumulated in the bucket. Unlike conventional token bucket, the contents of data queue 140 can be modified by volume reducer 130.

Access to data queue 140 by traffic shaper 120 and by volume reducer 130 is synchronized. The messages in the head of data queue 140 cannot be transmitted while being processed by volume reducer 130, even if tokens are available.

Consistent with the present invention, it is important to note that in practice tokens are usually added to a bucket at intervals significantly larger than $1/R_{out}$ seconds. Thus, if the length of an interval is Ta seconds, then approximately $T_a \cdot R_{out}$ bytes are added at each interval. The size of data queue 140 or the amount of data stored in it may be limited.

According to some embodiments, volume reducer 130 operates on the token bucket data queue 140. It employs analytic objects to reduce the amount of queued data. Given an input of $m_{in}$ messages its output is $m_{out}$ messages, some of which may be identical to the input messages. An output message can be a result of downsizing an input message or a result of merging elements of several input messages. An input message may be entirely absent from the output. Although uncommon, it is possible that $m_{out} > m_{in}$. However, the overall number of bytes in the output is guaranteed to be smaller than that in the input.

Volume reducer 130 operates periodically. If the amount of data in the queue is below a low watermark $W_{low}$ no reduction is performed. Otherwise, volume reducer 130 attempts to discard a portion of the data. When engaged, volume reduction is not applied to a queue prefix of size $p \cdot T_a \cdot R_{out}$ bytes where p is a positive integer. This allows transmitting messages as soon as new tokens are available in the next p token addition intervals. The value of p should be chosen in such a way so that $p \cdot T_a$ is slightly above the expected volume reduction processing time. Since the processing time is usually proportional to the amount of queued data, p may be re-evaluated each time that reduction is engaged. It is noted that $W_{low} > p \cdot T_a \cdot Rout$.

Consistent with some embodiments of the invention, before performing the reduction, volume reducer 130 needs to determine what portion of the data should be discarded, herein referred to as volume reduction ratio. The volume reduction ratio is derived from the amount of data in the queue 140, maximal queue capacity, the rate at which data is inserted into the queue and the current traffic shaping constraints 112. Below is presented how the ratio may be determined. It should be noted that the precision of this calculation may be somewhat enhanced by the skilled in the art. However, we have chosen to employ a more straightforward and safe (conservative) formula.

Following is an exemplary and non-limiting mathematic formulation of the calculation of desirable volume reduction ratio is provided. It is understood that other formulations are also possible. The formulation is provided below in terms of the aforementioned queue related constants.

Let q be the number of bytes in the queue. The high watermark $W_{high}$ designates a soft bound which q should not exceed. For example, if the amount of data that can be stored in the queue is limited by $Q_{max}$, then $W_{High}$ can be set to $\alpha Q_{max}$ ($0 < \alpha \le 1$, $W_{high} > W_{low}$). Alternatively, $W_{high}$ can be derived from the maximum time a message should be delayed by traffic shaping.

The desirable volume reduction ratio is calculated as follows. Let $T_r$ be the time during which the system should get rid of the extra q bytes (by transmitting some and discarding the rest). Let $R_{in}$ be the recent estimate of the rate at which new data is submitted to the traffic shaping module. In order to avoid reaching the high watermark, the following should hold:

$$R_{in} T_r < W_{high} - q \Rightarrow T_r < \frac{W_{high} - q}{R_{in}} \quad (1)$$

Let λ be the reduction ratio which we wish to determine It follows that:

$$R_{out} T_r = (1 - \lambda)(q + R_{in} T_r) \Rightarrow 1 - \lambda = \frac{R_{out}}{q/T_r + R_{in}} \quad (2)$$

From equations (1) and (2) we can deduce:

$$1 - \lambda < \frac{R_{out}}{\frac{qR_{in}}{W_{high} - q} + R_{in}} = \quad (3)$$

$$R_{out}/R_{in} \cdot (1 - q/W_{high}) \Rightarrow \lambda > 1 - R_{out}/R_{in} \cdot (1 - q/W_{high})$$

Consequently, the volume reduction ratio is set to be equal to the right-hand side of (3). Once the ratio is determined volume reducer 130 strives to discard λq least important bytes using the analytic objects.

Figure 3:
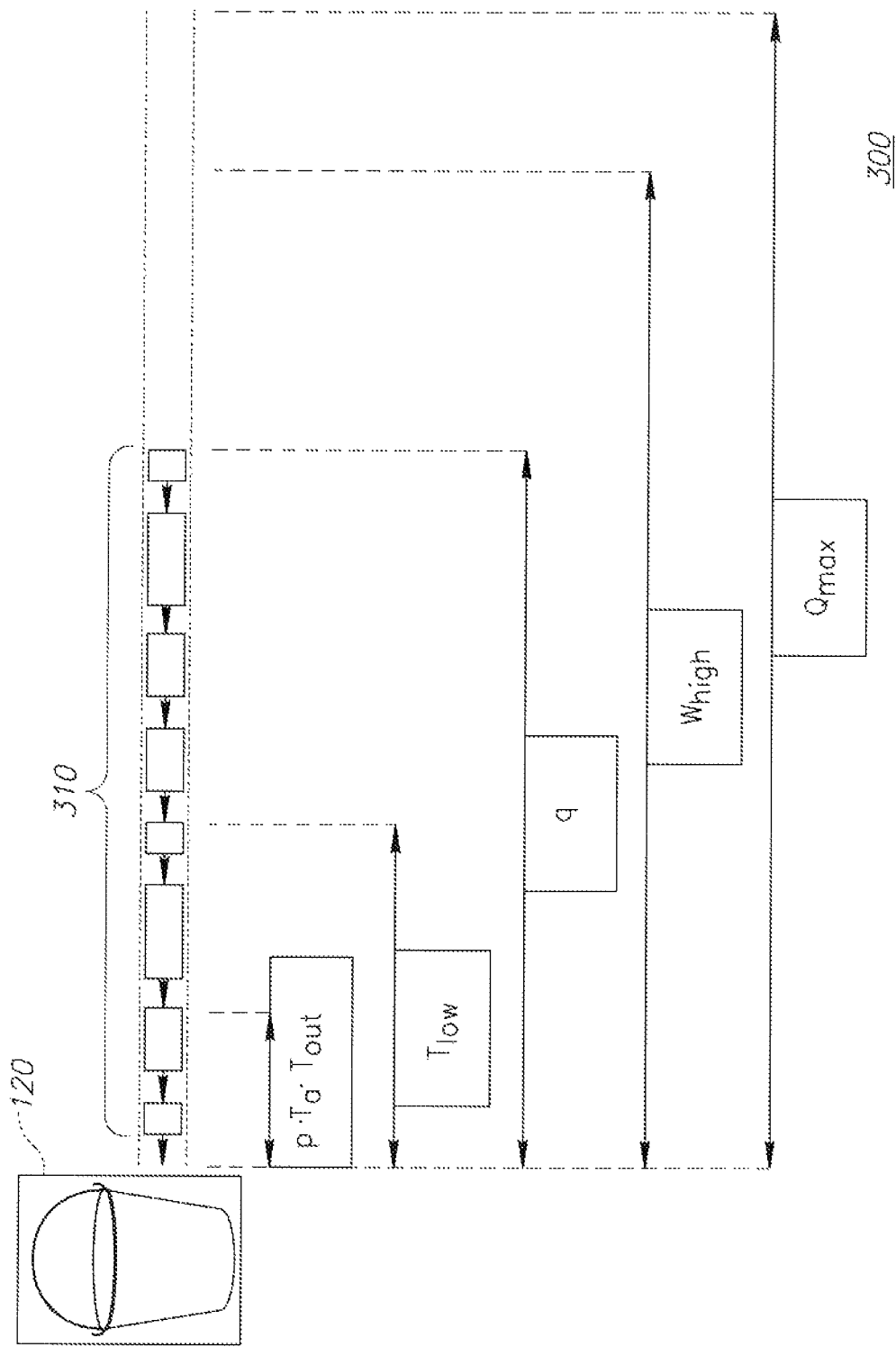
FIG. 3 is a diagram illustrating an aspect according to some embodiments of the invention.

FIG. 3 is a schematic block diagram illustrating a queuing process 300 in which a queue 310 is being reshaped by traffic shaper 120. The figure illustrates the queue related constants.

In an exemplary embodiment, analytic objects are employed in order to discard the required amount of the queued data. There are three types of analytic objects: queue handler, group handler and message handler. The three types differ by their scope so that they process the entire queue, a subset of messages or a single message, respectively.

A queue handler allows applications to consider ways to reduce volume, taking all the queued data into the account. It makes possible to replace the original messages with an entirely different set of messages. Each message in the output set can be derived from a number of input messages. A queue handler enables aggregation. It is possible for an application to perform all of the intended volume reduction using a single queue handler.

Table 1 presents an exemplary queue handler interface. The parameters of the single operation are the set of queued message and the target volume reduction ratio. The output is a new set of messages whose overall size is smaller than the original.

TABLE 1

Queue handler interface
<QueueProcessor> operations

| Type | parameter list | operation name |
| --- | --- | --- |
| Set<Message> | <return value> | Process |
| Set<Message> | queue | |
| Double | ratio | |

A group handler is similar to the queue handler. However, unlike queue handler, it operates on a subset of queued messages, i.e., a group. It is useful in processing messages of a specific kind. In addition to the volume reducing process operation present in queue handler, a group handler contains a method which determines whether a message belong to the group (illustrated in Table 2 below). Before reducing volume via a group handler, the framework first identifies the group members.

TABLE 2

Group handler interface
<GroupProcessor> operations

| Type | parameter list | operation name |
| --- | --- | --- |
| Set<Message> | <return value> | Process |
| Set<Message> | queue | |
| Double | ratio | |
| Boolean | <return value> | Contains |
| Message | message | |

A message handler is concerned with a single message. It includes: (i) parsing the message to yield format of the data and its priority records. Then sorting of the data which is carried out by volume reducer 130. Then, in a (ii) reducing stage, priority records are ordered according to the priority and the least important portion is omitted. In the message handle, analytic objects are used both on the (i) parsing, and the (ii) reducing stages.

Figure 4:
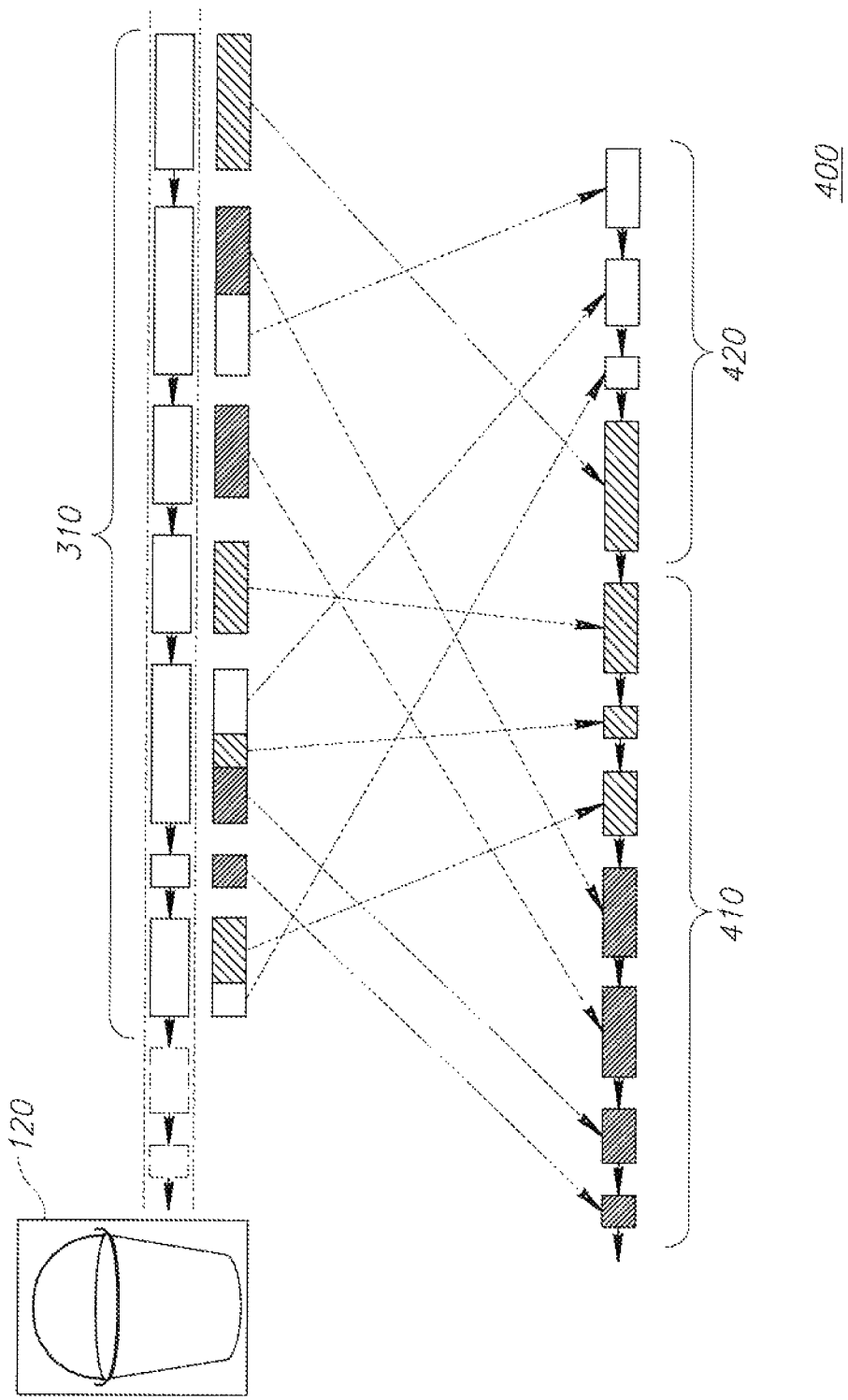
FIG. 4 is a diagram illustrating another aspect according to some embodiments of the invention.

FIG. 4 shows a schematic diagram showing priority records generated by message handlers. Data messages are queued in traffic shaper 120 in original queue 310 and are being segmented and reshaped by volume reducer (not shown). Invocation of message handler instances requires maximal interaction with the framework. First, lists of priority records are produced for all messages via the getPriority operation. Subsequently, all records are sorted in descending order of priority while preserving the original queue 310 order for records of the same priority. The records to be discarded 420 are taken from the tail of this sorted list so that their cumulative size corresponds to the volume reduction goal ($\lambda q$), 410 being the remaining records.

In the process described above the extreme priority values have special meaning. The highest priority value is assigned to data items that must never be discarded. The lowest priority value is assigned to data items that can be discarded immediately, independently of the volume reduction goal. After all analytic objects have been applied to the queue, the resulting messages are transmitted as soon as the traffic shaper 120 allows it.

The message handler interface is presented in Table 3. The getPriority operation determines the priorities of various message parts and their respective sizes. The remove operation produces a new version of the message without the parts indicated by the parameter list. The message handler interface utilizes the priority record construct which represents a part of a message and contains the part's ID, priority and size. The choice of data to be discarded is based on priority values contained in priority records. If all parts of a message have the same priority, it is represented by a single priority record, in which case the encapsulated priority is considered to be the message priority.

TABLE 3

Message handler interface
<MessageProcessor> operations

| Type | parameter list | operation name |
| --- | --- | --- |
| List<PriorityRecord> | <return value> | getPriority |
| Message | message | |
| Message | <return value> | Remove |
| List<PriorityRecord> | parts | |

In some scenarios the aforementioned queue related volume reduction techniques may be qualitatively or quantitatively insufficient in terms of the required volume reduction or in case some type of messages need to be remained untouched. One solution is to apply the queue related volume reduction techniques whereas for some messages groups, one or more group directives are applied, wherein the group directive overrides the queue related volume reduction techniques. According to an exemplary embodiment a group directive is essentially a rule that overrides the priority-based choice of the data to be discarded. Similarly to a group handler, a group directive can determine the relevant messages, i.e., the messages to which the rule applies.

The group directives may be defined as follows:
1. Do not discard more than k or x % of messages belonging to the group AND discard [newest/oldest/random]
2. Keep at least k or x % of message belonging to the group AND keep [newest/oldestl/random]

If some of the group directives precludes disposal of a certain record it is excluded while records with higher priorities are considered for disposal. The records to be discarded 420 are then broken down to lists according to the message to which they belong. Finally, the resulting lists are used as parameters of the remove operation of the respective message handler instances.

According to the exemplary embodiment, the application may implement any number of queue handlers and group handlers (including zero). However, there may be no more than a single message handler. When the volume reduction is engaged, first the queue handlers are invoked, then the group handlers and finally the message handler. The processors of the same type are invoked in the order in which they were defined. If at any point the goal of volume reduction is achieved before all analytic objects have been applied, the processing may (successfully) terminate. The choice of the analytic object types to implement and their number depends on the nature of the application.

Although the application may define a single message handler, the number of required message handler instances equals to the number of messages in the queue. Each message handler instance handles a single message. This allows a message to be parsed only once rather than on each invocation of a message handler operation.

It may be further noted that invocation of a queue handler may affect all the queued data. Invocation of a group handler may affect the corresponding group of messages. It should be further noted that message handlers do not necessarily create a one-to-one relationship between the priority records and the message elements. Therefore, application logic may be required, in the aforementioned reduction stage of the message handler, in order to remove the message elements according to the ordered priority records.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The aforementioned flowchart and diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", can or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A system for managing traffic over a communication link between a transmitting node and a receiving node, the system comprising:
   a processor;
   and a memory device coupled to the processor;
   a congestion monitor configured to monitor traffic shaping constraints, comprising at least one of: a transmission rate and a burst size;
   a traffic shaper configured to (i) accumulate incoming messages at the transmitting node into a data queue of a variable size; and (ii) transmit the messages from the data queue to the receiving node over the communication link; and
   a volume reducer configured to apply a first volume reduction ratio to messages in the data queue by:
   (i) estimating, using one or more analytic objects associated with a logic indicative of format and content of the messages derived from one or more applications associated with the messages, a desired amount of data that is to be discarded from messages in the data queue, based on: (a) the size of the data queue,(b) the traffic shaping constraints, and (c) message content and format indicating various message parts and respective sizes for the message parts,
   wherein at least a first analytical object is implemented based on knowledge of a first application generating a first group of messages, such that the first analytical object provides the volume reducer with details about the content and the format of the first group of messages;
   (ii) sorting message parts in the data queue by an order of importance, based on the analytic objects; and
   (iii) discarding, based on the analytic objects, the message parts from the messages in the data queue, such that the discarded data is ranked lowest according to the order of importance,
   wherein the first reduction ratio satisfies:

$$1 - \lambda < \frac{R_{out}}{\frac{qR_{in}}{W_{high} - q} + R_{in}} = \frac{R_{out}}{R_{in}} \cdot \left(1 - \frac{q}{W_{high}}\right) \Longrightarrow$$

$$\lambda > 1 - \frac{R_{out}}{R_{in}} \cdot \left(1 - \frac{q}{W_{high}}\right)$$

wherein $\lambda$ is the first reduction ratio, wherein $R_{out}/R_{in}$ comprises a ratio between a rate of bytes entering the traffic shaper to those exiting the traffic shaper, and wherein q/W is a ratio between a number of bytes in the data queue (q) to an upper bound of the number of bytes ($W_{high}$);
   wherein the volume reducer further applies at least one of:
   (i) a second volume reduction ratio to a group of messages in the data queue, that have a common characteristic, to yield reduced size messages, in response to determining that applying the first volume reduction ratio did not result in the message volume in the queue to be reduced below a first threshold level, or
   (ii) a third volume reduction ratio to a single message in the data queue to remove specified elements of the message based on a priority associated with the single message, in response to determining that applying the second volume reduction ratio did not result in the message volume in the queue to be reduced below a second threshold level
   wherein the traffic shaper transmits the messages from the data queue after the volume reducer discards the desired amount of data from the data queues;
   wherein the congestion monitor, the traffic shaper and the volume reducer are stored in the memory.

2. The system according to claim 1, wherein the momentary traffic shaping constraints are determined based on at least one specified activity indicative of network load or lack thereof, monitored on at least one of: the transmitting node and the receiving node.

3. The system according to claim 1, wherein the momentary traffic shaping constraints are provided remotely from an external source independent of the transmitting node and the receiving node.

4. The system according to claim 1, wherein an access to the data queue by the traffic shaper and by the volume reducer is synchronized such that messages in a head of the data queue are not transmitted while the volume reducer estimates, sorts or discards data therefrom.

5. The system according to claim 1, wherein the volume reducer discards the data such that a reduction in the size of the data queue in terms of number bytes is achieved, whenever the size of the data queue exceeds a specified threshold, by at least one of: downsizing a size of at least one of the incoming messages, merging elements of a plurality of the incoming messages, and one or more application-specific message transformations.

6. The system according to claim 1, wherein the volume reducer uses at least one of: (i) one or more queue handlers, each of which is configured to apply to the incoming messages stored in the data queue, a first volume reduction operation, to yield reduced size messages according to a first volume reduction ratio; (ii) one or more group handlers, each of which is configured to determine a group of messages having a common characteristic and apply to the incoming messages in the determined group, a second volume reduction operation, to yield reduced size messages according to a second volume reduction ratio; and (iii) a message handler configured to be applied to a single message and to: (i) determine the priority of the message or elements thereof and (ii) remove specified elements of the message.

7. A method of managing traffic over a communication link between a transmitting node and a receiving node, the method comprising:
    monitoring traffic shaping constraints, comprising at least one of: a transmission rate and a burst size;
    accumulating incoming messages at the transmitting node into a data queue of a variable size;
    transmitting the messages from the data queue to the receiving node over the communication link; and
    applying a first volume reduction ratio to messages in the data queue by:
        estimating, using one or more analytic objects associated with a logic indicative of format and content of the messages derived from one or more applications associated with the messages, a desired amount of data that is to be discarded from messages in the data queue, based on: (a) the size of the data queue, (b) the traffic shaping constraints, and (c) message content and format indicating various message parts and respective sizes for the message parts,
    wherein the first reduction ratio satisfies:

$$1 - \lambda < \frac{R_{out}}{\frac{qR_{in}}{W_{high} - q} + R_{in}} = \frac{R_{out}}{R_{in}} \cdot \left(1 - \frac{q}{W_{high}}\right) \Longrightarrow$$

$$\lambda > 1 - \frac{R_{out}}{R_{in}} \cdot \left(1 - \frac{q}{W_{high}}\right)$$

wherein $\lambda$ is the first reduction ratio, wherein $R_{out}/R_{in}$ comprises a ratio between a rate of bytes entering the traffic shaper to those exiting the traffic shaper, and wherein q/W is a ratio between a number of bytes in the data queue (q) to an upper bound of the number of bytes ($W_{high}$);
    wherein at least a first analytical object is implemented based on knowledge of a first application generating a first group of messages, such that the first analytical object provides the volume reducer with details about the content and the format of the first group of messages;
    sorting message parts in the data queue by an order of importance, based on the analytic objects; and
    discarding, based on the analytic objects, the message parts from the messages in the data queue, such that the discarded data is ranked lowest according to the order of importance,
further applying at least one of:
    (i) a second volume reduction ratio to a group of messages in the data queue, that have a common characteristic, to yield reduced size messages, in response to determining that applying the first volume reduction ratio did not result in the message volume in the queue to be reduced below a first threshold level, or
    (ii) a third volume reduction ratio to a single message in the data queue to remove specified elements of the message based on a priority associated with the single message, in response to determining that applying the second volume reduction ratio did not result in the message volume in the queue to be reduced below a second threshold level,
wherein the traffic shaper transmits the messages from the data queue after the volume reducer discards the desired amount of data from the data queue.

8. The method according to claim 7, wherein the momentary traffic shaping constraints are determined based on at least one specified activity indicative of network load or lack thereof, monitored on at least one of: the transmitting node and the receiving node.

9. The method according to claim 7, wherein the momentary traffic shaping constraints are provided remotely from an external source independent of the transmitting node and the receiving node.

10. The method according to claim 7, wherein an access to the data queue for the transmitting, the estimating, the sorting, and the discarding is synchronized such that messages in a head of the data queue are not transmitted while the estimating, the sorting, or the discarding is being carried out.

11. The method according to claim 7, wherein the discarding is carried out such that a reduction in the size of the data queue in terms of number of bytes is achieved, whenever the size of the data queue exceeds a specified threshold, by at least one of: downsizing a size of at least one of the incoming messages; merging elements of a plurality of the incoming messages; and one or more application-specific message transformations.

12. The method according to claim 7, wherein the discarding is carried out by applying to all of the incoming messages stored in the data queue, a specified volume reduction operation, to yield a reduced size messages according to a specified volume reduction ratio.

13. The method according to claim 7, wherein the discarding is carried out by determining at least one group of messages having a common characteristic and applying to all of the incoming messages in the determined group, a specified volume reduction operation, to yield a reduced size messages according to a specified volume reduction ratio.

14. The method according to claim 7, wherein the discarding is carried out by: (i) determining a priority of a specified message or elements thereof and (ii) removing specified elements of the specified message.

15. The method according to claim 7, wherein in case the discarding is insufficient in quantity or quality, one or more group directives are applied such that they override the discarding, according to specified rules applicable to messages of specified groups.

16. A computer program product comprising logic code embedded in
a non-transitory data storage medium wherein execution of the logic code on a computer causes the computer to:
monitor traffic shaping constraints, comprising at least one of: a transmission rate and a burst size;
accumulate incoming messages at the transmitting node into a data queue of a variable size;
transmit the messages from the data queue to the receiving node over the communication link; and
apply a first volume reduction ratio to messages in the data queue by:
estimating, using one or more analytic objects associated with a logic indicative of format and content of the messages derived from one or more applications associated with the messages, a desired amount of data that is to be discarded from messages in the data queue, based on: (a) the size of the data queue, (b) the traffic shaping constraints, and (c) message content and format indicating various message parts and respective sizes for the message parts,
wherein the first reduction ratio satisfies:

$$1 - \lambda < \frac{R_{out}}{\frac{qR_{in}}{W_{high} - q} + R_{in}} = \frac{R_{out}}{R_{in}} \cdot \left(1 - \frac{q}{W_{high}}\right) \Longrightarrow$$

$$\lambda > 1 - \frac{R_{out}}{R_{in}} \cdot \left(1 - \frac{q}{W_{high}}\right)$$

wherein $\lambda$ is the first reduction ratio, wherein $R_{out}/R_{in}$ comprises a ratio between a rate of bytes entering the traffic shaper to those exiting the traffic shaper, and wherein q/W is a ratio between a number of bytes in the data queue (q) to an upper bound of the number of bytes ($W_{high}$);
wherein at least a first analytical object is implemented based on knowledge of a first application generating a first group of messages, such that the first analytical object provides details about the content and the format of the first group of messages;
sorting message parts in the data queue by an order of importance, based on the analytic objects; and
discarding, based on the analytic objects, the message parts from the messages in the data queue, such that the discarded data is ranked lowest according to the order of importance,
further apply at least one of:
(i) a second volume reduction ratio to a group of messages in the data queue, that have a common characteristic, to yield reduced size messages, in response to determining that applying the first volume reduction ratio did not result in the message volume in the queue to be reduced below a first threshold level, or
(ii) a third volume reduction ratio to a single message in the data queue to remove specified elements of the message based on a priority associated with the single message, in response to determining that applying the second volume reduction ratio did not result in the message volume in the queue to be reduced below a second threshold level,
transmit the messages from the data queue after discarding the desired amount of data from the data queue.

17. The computer program product according to claim 16, wherein the momentary traffic shaping constraints are determined based on at least one specified activity indicative of network load or lack thereof, monitored on at least one of: the transmitting node and the receiving node.

18. The computer program product according to claim 16, wherein the momentary traffic shaping constraints are provided remotely from an external source independent of the transmitting node and the receiving node.

19. The computer program product according to claim 16, wherein access to the data queue is synchronized such that messages in a head of the data queue are not transmitted during the estimating, the sorting or the discarding of data therefrom.

20. The computer program product according to claim 16, wherein the data is discarded such that a reduction in the size of the data queue in terms of number bytes is achieved, whenever the size of the data queue exceeds a specified threshold, by at least one of: downsizing a size of at least one of the incoming messages; merging elements of a plurality of the incoming messages; and one or more application-specific message transformations.

21. The computer program product according to claim 16, wherein the volume is reduced by way at least one of: (i) one or more queue handlers, each of which is configured to apply to the incoming messages stored in the data queue, a first volume reduction operation, to yield reduced size messages according to a first volume reduction ratio; (ii) one or more group handlers, each of which is configured to determine a group of messages having a common characteristic and apply to the incoming messages in the determined group, a second volume reduction operation, to yield reduced size messages according to a second volume reduction ratio; and (iii) a message handler configured to be applied to a single message and to: (i) determine the priority of the message or elements thereof and (ii) remove specified elements of the message.

* * * * *